| United States Patent [19] | [11] Patent Number: 4,910,523 |
|---|---|
| Huguenin et al. | [45] Date of Patent: Mar. 20, 1990 |

[54] MICROMETER WAVE IMAGING DEVICE

[75] Inventors: Richard G. Huguenin, South Deerfield; Paul F. Goldsmith, Leverett; Naresh C. Deo, Conway; David K. Walker, Northfield, all of Mass.

[73] Assignee: Millitech Corporation, South Deerfield, Mass.

[21] Appl. No.: 117,600

[22] Filed: Nov. 6, 1987

[51] Int. Cl.[4] .................... G01S 13/89; H01L 31/02
[52] U.S. Cl. .................................. 342/179; 342/351; 250/332
[58] Field of Search ............... 342/179, 351; 356/28.5; 250/330, 332; 358/110, 113

[56] References Cited

U.S. PATENT DOCUMENTS

| 3,746,454 | 7/1973 | Pace et al. ................. 250/332 X |
| 4,164,740 | 8/1979 | Constant ..................... 342/179 |
| 4,611,912 | 9/1986 | Falk et al. ................. 356/28.5 X |

Primary Examiner—Thomas H. Tarcza
Assistant Examiner—Gilberto Barrón, Jr.
Attorney, Agent, or Firm—Pennie & Edmonds

[57] ABSTRACT

A millimeter wave sensing device is disclosed comprising a local oscillator source generating a millimeter wave signal which is mixed with millimeter wave radiation reflected from or emitted by objects in a field of view. The mixing is performed in a staring array of mixer/detector elements which need not be mechanically or electronically scanned to generate signals responsive to the entire field of view. In a first embodiment of the invention, the device detects millimeter wave radiation emitted by or reflected from the object to be imaged. In a second embodiment of the invention, the oscillator used to provide the local oscillator signal is also used to illuminate the field of view. In the second embodiment of the invention, the oscillator signal is preferably linearly polarized, and a polarizing grid is used to separate the local oscillator signal and illumination beam and direct them in a simple and efficient manner. A twist reflector may also be used to rotate the polarization of a portion of the beam to direct it onto the mixer/detector array for mixing with the received signal from the field of view.

Improved constructions of millimeter wave source and mixer/detector elements are also disclosed, which greatly simplify construction of the device.

68 Claims, 4 Drawing Sheets

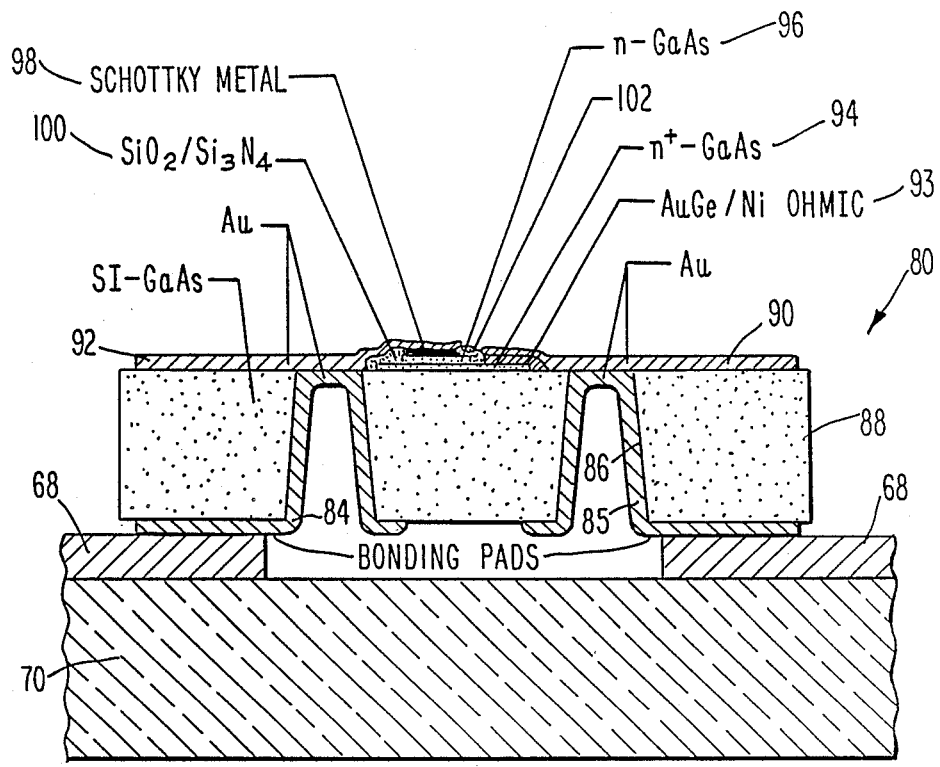
*Fig. 8*
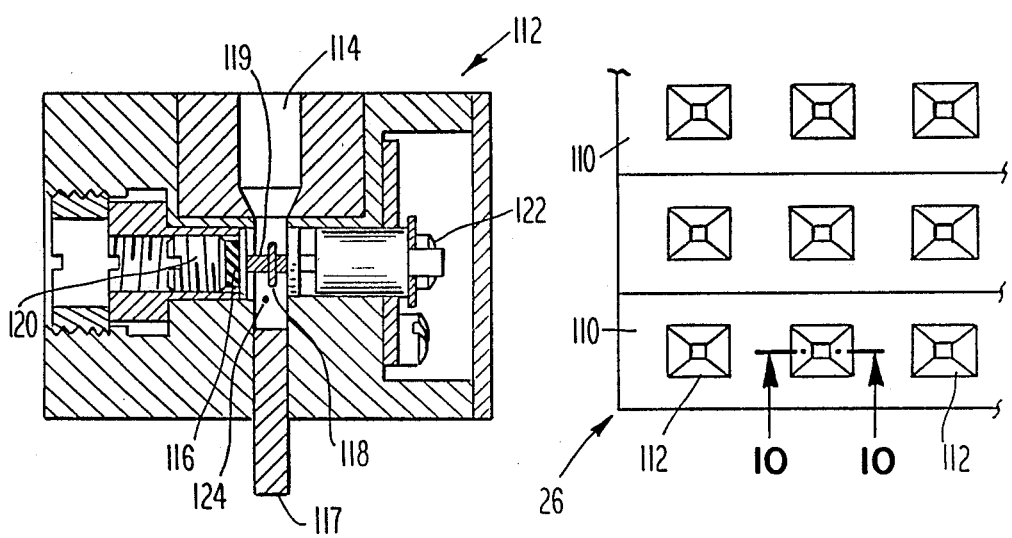
*Fig. 10*  *Fig. 9*

MICROMETER WAVE IMAGING DEVICE

FIELD OF THE INVENTION

This invention relates to apparatus and methods for detecting millimeter-wavelength radiation reflected from or emitted by objects in a field of view, and for generating signals and images responsive thereto.

BACKGROUND OF THE INVENTION

Generation of images or other useful signals responsive to detected millimeter waves (radiation having wavelengths in approximately the 1 cm-1 mm range, that is, of between approximately 30 and 300 GHz frequency) reflected from or emitted by objects in a field of view is desired in many applications. This is largely because millimeter waves are not as completely attenuated by moisture in the air, as are, for example, visible and infrared radiation. For example, the fact that visible light is very thoroughly attenuated by fog currently prevents aircraft from landing and taking off in fog, which obviously is highly inconvenient to travellers. Millimeter waves also penetrate other adverse environments such as smoke, clouds of chemical gas, dust and the like wherein the particles are of less than millimeter size.

A further advantage of millimeter waves, particularly with respect to microwaves, is that many of the components, notably antennas, can be made much smaller due to the shorter wavelength of the radiation. Accordingly, it would be desirable to use millimeter waves in various applications where smaller antennas are needed, for example, in aircraft applications, or in other mobile, marine or space applications.

There are several reasons why practical millimeter wave imaging systems are not now available. One is that to generate an image using a millimeter-wave sensor has been thought to require either mechanical or electronic scanning of the sensor with respect to the field of view. Mechanical scanning devices in which a sensor is physically moved through a range of azimuths, elevations or both, defining a field of view, are complex and subject to failure. Electronic scanning is also complex and at millimeter-wave frequencies requires employment of electronic phase shifting or switching techniques, which are relatively complex to implement.

More specifically, electronic scanning systems proposed to date have involved aperture-plane arrays, that is, arrays of radiation sources, which emit radiation which varies in phase from one emitter to the next. Such "phased-array" systems are described in *Introduction to Radar Systems*, Skolnik (1980), especially in chapter 8, pp. 278–342. Broadly, the signal transmitted by each of the sources travels outwardly in a different direction; a single detector element detects radiation reflected from any objects in the field of view, and the phase of the detected radiation is used to determine the azimuth and elevation of the reflecting object.

Such phased-array systems are complex by their nature; the complexity would only be compounded by the high frequencies inherent in millimeter-wave systems.

One conventional method of reducing the frequency of a received signal to a lower frequency for convenience in signal processing is to mix the received signal with a local oscillator signal of generally similar frequency. As is well known, this "mixing" results in sum and difference signals. For example, Skolnik, op. cit., discusses at page 82 that a diode or other non-linear element may be used in a radar system to heterodyne an echo signal with a portion of the transmitter signal resulting in a difference signal or "beat note". The difference signal is reduced in frequency, such that it can be processed using more conventional electronic circuitry and techniques. However, normally a millimeter-wave local oscillator signal must be combined with the received signal using waveguide or transmission line technology; while not infeasible, this requirement has limited millimeter-wave receivers to a single imaging element, which therefore must be scanned either mechanically or electronically as described above to generate a video image of an object to be imaged. As noted, either scanning technique introduces substantial complexity to an imaging system. Furthermore, it would be desirable to provide a system in which millimeter-wave energy is transmitted from an emitter onto the field of view to illuminate it. It is difficult at present to construct a sufficiently powerful oscillator to provide an adequately strong received signal, as present day solid state millimeter wave sources such as Gunn diode oscillators and the like are limited in their millimeter wave power output.

References are known which suggest that a focal plane array of antenna elements responsive to millimeter wave radiation can be constructed. See Gillespie et al, "Array Detectors for Millimeter Line Astronomy" Astron, Astrophys, 73, 14–18 (1979). This reference shows an array of elements for detection of millimeter wave radiation, in which a local oscillator signals is introduced from a central feed area of a primary mirror of a Cassegrain telescope. As acknowledged by Gillespie et al, this would lead to serious difficulties with uniformity of the local oscillator signal over the array. Furthermore, Gillespie et al only teaches a single element detector, that is, Gillespie et al does not teach a multiple element array in which each pixel of the image correspond to one of the detectors.

Other references show systems in which the elements of the focal plane array are intended to map to elements of the ultimate image. See, for example, Yngvesson et al "Millimeter Wave Imaging System With An Endfire Receptor Array", 10*th International Conference on Infrared and Millimeter Waves* (1985). Other references of comparable disclosure are also known. This document suggests a multiple element focal plane array wherein each element includes a diode connected across spaced antenna elements for rectification of received millimeter-wave energy and superheterodyne signal detection. Yngvesson et al shows slots extending transverse to the slot between the spaced antenna elements of each element of the array for low-pass filtering purposes. However, the Yngvesson et al reference teaches only Cassegrain or other reflector telescope designs, in which the local oscillator signal is injected through an aperture in the reflector. Such arrangements would involve the same difficulties with respect to uniformity of illumination as in the Gillespie et al reference. Furthermore, such Cassegraintelescope arrangements are not optimal for many desired applications of millimeter wave detection technology; they are bulky, difficult to fabricate and sensitive to physical mishandling. A more compact, more rugged and less complex design is clearly required by the art.

SUMMARY OF THE INVENTION

Accordingly, it is an object of the invention to provide a millimeter wave imaging device which does not employ mechanical or electronic scanning in order to generate an image of objects in a field of view.

It is a further object of the invention to provide a millimeter wave signal detection system which does not require waveguide or other transmission line techniques to combine a local oscillator signal with a received signal.

It is a further object of the invention to provide a millimeter wave detector array which does not involve a Cassegrain-telescope optical system, and in which injection of a local oscillator signal into each of the elements of the detector array does not require an aperture in a focussing element.

It is a further object of the invention to provide a millimeter wave detection system in which a single radiation source is used both to illuminate the field of view with millimeter wave radiation and to provide a local oscillator signal for mixing with the received reflected signal, substantially simplifying the construction of the system as compared to a system in which separate illumination and local oscillator sources are used.

It is a further object of the invention to provide a millimeter wave detection system in which an array of oscillating elements is used to generate illumination and local oscillator signals, and a much larger number of mixer/detector elements in a second array are used to detect signals corresponding to reflecting objects in the field of view.

The above objects of the invention and others which will appear as the discussion proceeds are satisfied by the present invention, which comprises a "staring", that is, unscanned, millimeter wave imaging device.

In a first embodiment of the invention, energy from a local oscillator source comprising a plurality of Gunn diode or other oscillators emitting millimeter-wave energy is directed onto a polarization grid or frequency-selective transmitting/reflecting surface in the optical path between a multiple element mixer/detector array and the field of view. The optical path need not be collinear. Millimeter wave radiation emitted by or reflected from objects in the field of view passes through a lens, an optional high pass filter and the polarization grid or frequency-selective surface, and is combined by each of the mixer/detector elements of the array with the local oscillator signal. In this way, no waveguide or other complex transmission line technologies are required to combine the local oscillator signal and the signal from the field of view. The mixers may each comprise a Schottky diode or other nonlinear device formed directly across planar conductors comprising the antenna elements of each of the mixer/detector elements of the array. After mixing in the nonlinear devices, the difference signal, now at an intermediate frequency, can be processed conventionally, e.g., amplified and employed to provide a visible image of the field of view.

In the second preferred embodiment of the invention, the oscillator signal is also used to illuminate the field of view with millimeter wave radiation. In this case, linearly-polarized millimeter wave energy output by the source is divided into major and minor portions by a polarizing grid. The major portion is reflected from the grid toward the field of view through the lens and a preferable quarter-wave plate, becoming an illumination beam which is incident on objects in the field of view. The remainder of the oscillator signal passes through the polarizing grid and is reflected by a twist reflector back onto the polarizing grid with proper polarization, such that it is reflected towards the detector array, becoming a local oscillator signal. When the illumination beam is reflected from the objects in the field of view, it again passes through the lens, the quarter wave plate, and the polarizing grid, and is incident on the array of mixer/detector elements, where it is combined with the local oscillator signal. The difference frequency signal can then be used, for example, to form an image.

The output signals from the array can also be employed for purposes not directly involving the formation of an image. For example, amplitude variation in the signal output from individual sensors at successive instants of time may be used to detect moving objects in the field of view, while motion detected similarly with respect to all of the mixer/detector elements of the array can be used to measure the motion of the device as a whole. Thus, the millimeter-wave sensing device of the invention can be employed in many types of motion-sensing applications, such as collision avoidance, navigation, and the like. Other forms of signal processing and other uses of the output signals provided by the device of the invention are also within the scope of the invention.

BRIEF DESCRIPTION OF THE DRAWINGS

The invention can be best understood by reference to the accompanying drawings, in which:

FIG. 8 shows a cross-sectional view of a Schottky mixer diode employed in each of the individual mixer/detector elements of the imaging array;

FIG. 9 shows an overall view of a portion of the aperture-plane source array used to provide the millimeter-wave signal; and FIG. 10 shows a cross-sectional view of one of the elements of the source array taken along line 10—10 of FIG. 9.

DESCRIPTION OF THE PREFERRED EMBODIMENTS

Figure 1:
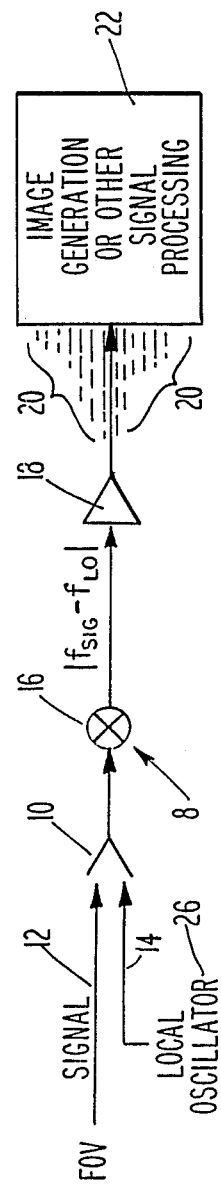
FIG. 1 shows a block diagram of one of the mixer/detector elements of the imaging array of the sensor according to the invention, in the first embodiment thereof.
Figure 2:
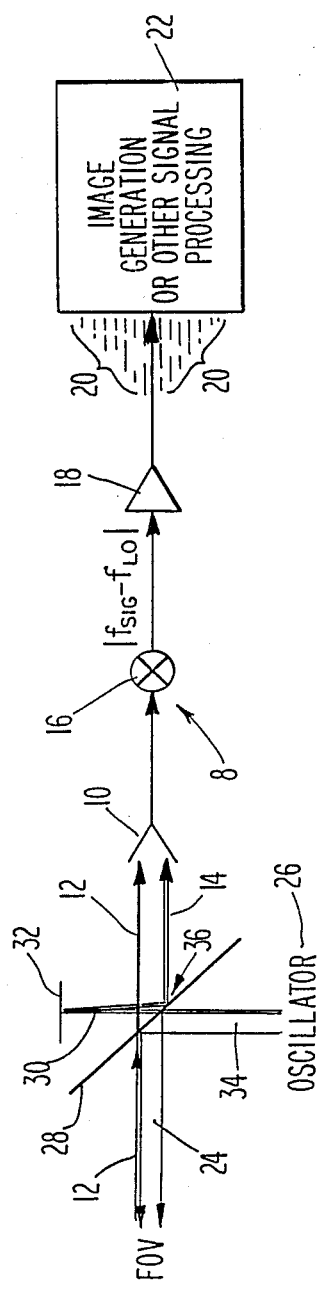
FIG. 2 shows a view comparable to FIG. 1 of the individual mixer/detector elements of the imaging array in the second embodiment of the invention.

FIG. 1 is a block diagram of the individual signal processing components employed in each of the mixer/detector elements 8 of the invention, while FIG. 2 is a comparable block diagram of identical mixer/detector elements 8 employed in the second embodiment of the invention, in which the signals reaching the elements are derived differently. Common elements in each Figure are numbered similarly.

In FIG. 1, an antenna 10 receives a millimeter wave signal 12 reflected from or emitted by an object in the field of view (FOV), and a local oscillator signal 14 from a local oscillator 26. These are combined in a mixer 16. The difference signal, at frequency $|f_{sig}-f_{LO}|$ is supplied to a video or radio frequency amplifier 18. The amplified signal, together with a number of similar signals 20 from other identical elements 8 of the array, is passed to image generation or other signal processing circuitry 22 for generation of an image, or other purposes. Since the local oscillator signal 14 and received signal 12 are not at the same frequency, their mixing is termed heterodyne mixing.

More particularly, a number of the mixer/ detector elements 8 shown schematically in FIG. 1 are arranged in a detector array. The output of each element 8 is a signal the frequency of which is responsive to the difference between the frequency of the received signal 12 and the frequency of the local oscillator signal 14, and the amplitude of which is approximately proportional to the amplitude of signal 12. The signal output by each element 8 corresponds to a portion of the field of view; if an image is to be formed, each element 8 may be taken to correspond to a particular picture element (hereinafter "pixel") of the image. Accordingly, since a multiple element array is used, it need *not* be scanned either mechanically or electronically to generate a complete image. For example, an ordinary raster-scanned video picture can be generated simply by successively interrogating each of the imaging elements 8 along successive rows of the array of elements.

This method of derivation of an image is a marked departure from the prior art, in which only single sensor millimeter-wave detectors have been used, and which therefore have required mechanical or electronic scanning to generate an image. As noted above, such mechanical or electronic scanning systems have numerous deficiencies and defects. According to this aspect of the invention, a "staring" imaging array, that is, one which is not scanned, is provided.

According to another important aspect of the invention, the local oscillator signal 14 and the signal 12 received from the object are combined by a mixer 16 which is integrally combined with the antenna element 10 in which they are detected. Accordingly, no waveguide technology or the like is required to combine the local oscillator signal 14 with the signal 12 received from the field of view. This greatly simplifies construction of the apparatus according to the invention, in a manner which is detailed below.

FIG. 2 shows a view corresponding to FIG. 1 of the second embodiment of the invention, in which energy provided by the oscillator 26 providing the local oscillator signal is also used to illuminate the field of view. The mixer/detector elements 8 again each comprise an antenna 10 which receives a local oscillator signal 14 and a signal 12 from the field of view. Mixer 16 combines the local oscillator signal 14 and the signal 12 from the field of view. The difference signal at the frequency $|f_{sig}-f_{LO}|$ is supplied to a video or radio-frequency amplifier 18; its output, together with similar signals 20 from a number of identical elements 8, may again be supplied to image generation or other signal processing circuitry 22, by which they may be employed, for example, to generate an image.

In the embodiment of FIG. 2, however, the major portion of energy 34 provided by oscillator 26 is transmitted as an illumination beam 24 onto the field of view. More particularly, the millimeter-wave energy signal 34 generated by the source 26 is linearly-polarized, such that it can be split into major and minor components 24 and 30 respectively by a polarizing grid 28. The major component 24 is employed as an illumination beam after reflection from the polarizing grid 28. The minor portion 30, which may include approximately 10% of the total signal energy output by the oscillator 26, passes through the polarizing grid 28, and is reflected from a reflecting means 32, which rotates its polarization through 90°, back onto the first reflector 28, which reflects it toward the array of mixer/detector elements 8. The minor portion 30 thus becomes a local oscillator signal 14, which is then combined with the reflected signal 12 from the field of view. Normally the transmitted illumination signal is swept in frequency as a function of time; when the reflected signal is received, the local oscillator signal is then at a slightly different frequency, such that the difference signal is non-zero.

As noted, in the second embodiment of the invention, (and typically also in its first embodiment, depending on the design of the emitting array) the millimeter wave energy 34 emitted by the oscillator 26 is linearly polarized. This permits it to be divided conveniently into major and minor components 24 and 30, respectively, by a polarization-sensitive device such as polarizing grid 28. The reflector 32 on which the minor portion 30 of the beam is then incident may be a "twist reflector", which changes its polarization by 90°, such that when portion 30 is again incident on the polarizing grid 28, it is reflected therefrom, as indicated at 36. As noted, the minor portion 30 is then incident on element 8 as the local oscillator signal 14, and is mixed with the reflected signal 12 from the field of view.

Accordingly, in the embodiment of FIG. 2 it can be seen that the energy 34 from oscillator 26 is used both as an illumination beam 24 to illuminate the object and as the local oscillator signal 14 which is homodyned (i.e., signals at the same frequency are being mixed) with the signal 12 reflected from the field of view 12.

Multiple element staring sensors which provide output signals directly responsive to incident visible and infrared radiation are known, e.g., so called CCD arrays. The Yngvesson et al paper and others of similar import described above disclose suggestions for multiple element staring sensor arrays responsive to millimeter wave radiation, in which a local oscillator signal is injected into each of the elements of the array by means of a Cassegrain-telescope system. It is one object of the invention to avoid the complexity of construction of such a system.

Moreover, while it is known in imaging applications, e.g. in radar systems, to use a unitary signal source both to illuminate an object to be imaged and to provide a local oscillator signal for mixing with the reflected signal, no reference is known which suggests a means of doing this in which the local oscillator signal is also provided separately to each of the elements of a multiple-element detector array. According to the present invention, the same oscillator is used to illuminate the field of view and also to provide the local oscillator signal which is injected into each of the elements of a multiple-element detector array, again while avoiding the Cassegrain-telescope approach.

Figure 3:
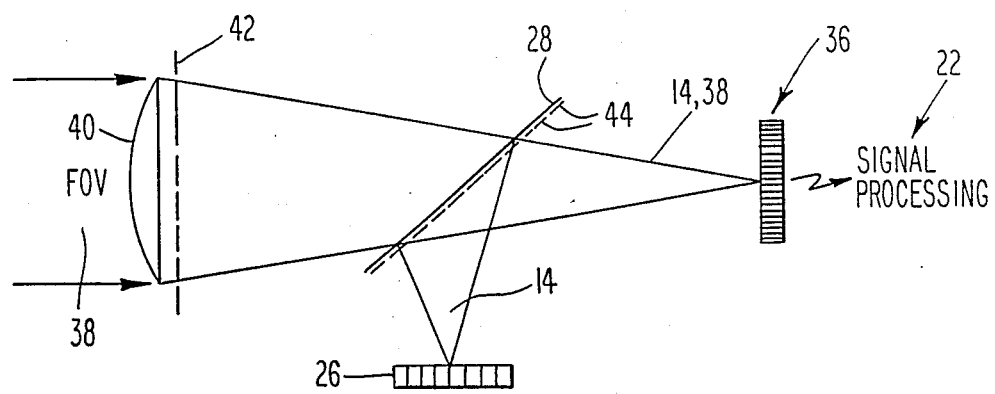
FIG. 3 shows an overall view of the optical arrangement of the imaging device of the invention in its first embodiment.

FIG. 3 shows a possible optical arrangement of the millimeter wave signal detecting system in the first embodiment of the invention discussed above in connection with FIG. 1. In one realization of this embodiment of the invention, local oscillator source 26 provides a linearly polarized beam of millimeter wave energy 14 which is reflected from a polarizing grid 28. The polarizing grid 28 is discussed in detail below, as is the source 26. In this realization of this embodiment, the local oscillator energy 14 is reflected by grid 28 directly towards an array 36 of mixer/detector elements 8, the structure of which is detailed below. Incident radiation 38, either reflected from or emitted by an object in the field of view, passes through a lens 40, preferably through a high pass filter 42, and is combined with the reflected local oscillator energy 14 in the array 36. The optical path shown is straight from the field of view through to the array 36, but this need not be the case. As discussed above, combination in the mixer/detector elements 8 of the array 36 of the local oscillator energy 14 with the signal 38 from the field of view results in sum and difference signals, as is well understood; according to the invention, the much lower frequency difference signal is then employed for image generation or other signal processing, as indicated generally at 22.

Figure 4:
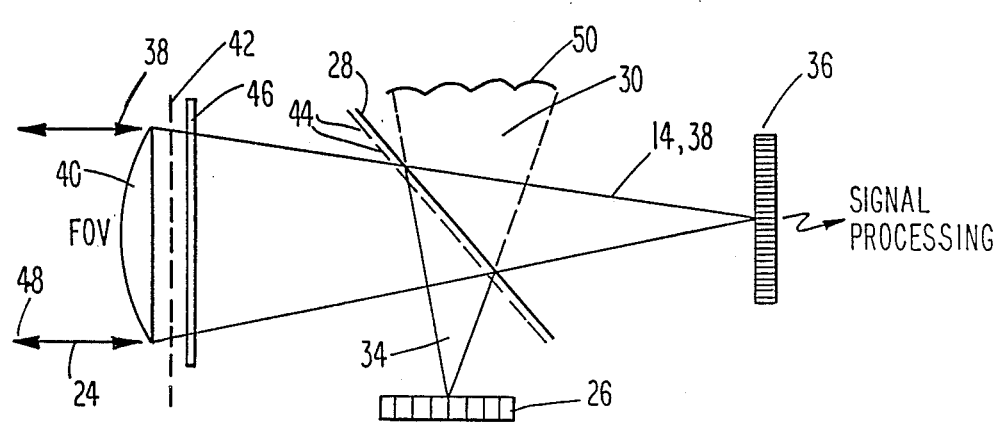
FIG. 4 shows a view comparable to that of FIG. 3 but relating to the second embodiment of the invention.

The embodiment of the invention depicted in FIG. 4 is generally similar to that of FIG. 3, and common elements are similarly numbered. Thus, incident radiation 38 reflected from an object in the field of view passes through lens 40, filter 42, a quarter-wave plate 46 to be described subsequently, and polarizing grid 28, after which it is combined with a local oscillator signal emitted by the source of millimeter wave radiation 26. However, in this case, the radiation 34 emitted by the source is divided by the polarizing grid 28 into major and minor portions 24 and 30 respectively. The major portion 24, desirably including about 90% of the millimeter wave energy, passes outwardly as indicated at 48 to illuminate the field of view with millimeter wave radiation. The remaining minor portion 30 of the radiation 34 emitted by the source 26 is incident on a twist reflector 50. This device, which is described in connection with FIG. 5, has the property of rotating the polarization of the linearly polarized incident energy by 90°. Accordingly, when the twist reflector 50 reflects the minor component 30 of the radiation onto the polarizing grid 28, it is then reflected towards the mixer/detector array 36 to become a local oscillator signal 14 for combination with the incoming illumination beam 38 after reflection from any objects in the field of view.

In this embodiment of the invention, the energy 34 provided by oscillator source 26 is used both to illuminate the field of view, and also as a local oscillator signal 14. The division of the millimeter wave energy 34 emitted by the source 26 is accomplished by the polarizing grid 28 in accordance with its polarizing properties discussed below. The polarizing grid 28 is also conveniently employed to redirect the minor portion 30 of the energy 34 onto the array 36 as a local oscillator signal 14 for homodyning with the reflected portion 38 of the energy.

It will be appreciated that according to both embodiments of the invention, the detector array is a staring, unscanned array of detectors in the focal plane; this may be instructively compared to prior aperture plane phased arrays of emitters employed with single detectors.

Referring now to the individual elements of the system shown in FIGS. 3 and 4, the lens 40 is generally as described in Goldsmith et al., "Gaussian Optics Lens Antennas", *Microwave Journal*, July 1984. The filter 42 is generally as described in Goldsmith, "QuasiOptical System Design", in *The Microwave System Designers Handbook* (1987). The filter 42 may comprise a metal plate having an array of holes drilled therein to provide a high pass filter for the millimeter wave frequencies of interest.

The polarizing grid 28 may comprise a series of parallel conductors spaced from one another by a dielectric medium. In a particularly preferred embodiment, the conducting members may be spaced parallel wires, e.g., of tungsten coated with gold, spaced in air. A less expensive alternative is to photolithograph flat conductive strips onto a dielectric substrate, e.g., Mylar TM. In either case, the orientation of the conductors (which are indicated generally at 44 in FIGS. 3 and 4) with respect to the direction of polarization of the electric field of the millimeter wave energy 34 emitted by the source 26 determines the fraction of the incident millimeter wave energy which is reflected; the remainder passes through the grid 28.

More particularly, in a preferred embodiment, the spacing of the conductors 44 is approximately equal to or less than the wavelength of the millimeter wave radiation emitted by the source 26 divided by five. This grid 28 transmits the component of the linearly polarized electric field perpendicular to the direction of the conductors and reflects the portion which is parallel to their direction. If the conductors are angled with respect to the direction of polarization of the radiation, a corresponding fraction passes through, the remainder being reflected.

In a second realization of the first embodiment of the invention, the polarizing grid 28 shown in FIG. 3 may be replaced by a frequency-selective transmitting/reflecting surface. In a preferred embodiment, this frequency selective surface is a dichroic reflector/high pass filter (hereinafter, "DR/HPF"), identical in principle to filter 42. That is, signal 38 from the field of view at frequency $f_{sig}$ is transmitted through the DR/HPF due to the frequency-selective nature of the DR/HPF, while the local oscillator signal 34 at frequency $f_{LO} < f_{sig}$ is reflected from the DR/HPF. The Goldsmith article referred to above describes DR/HPF components, which are commercially available from the assignee of this application.

A DR/HPF is potentially preferable to a polarizing grid in the first embodiment of the invention because the DR/HPF provides more efficient reflection of the local oscillator signal 34, enabling use of a lower-power oscillator source 26 in a given system. Use of a DR/HPF in place of the polarizing grid 28 also obviates the need for high pass filter 42. Further, if a DR/HPF is used, there is no need for the local oscillator signal to be linearly polarized, though this is a low-cost consequence of the design chosen for oscillator 26. It will be clear to those skilled in the art that a DR/HPF can *not* be used as a substitute for the polarizing grid 28 in the second embodiment of the invention, because in that case the grid is employed both as a reflector and transmitter of energy at a single frequency. Hence, a polarization-selective grid 28 is employed together with a source of linearly-polarized energy.

As indicated, in the second embodiment of the invention, a quarter-wave plate 46 is typically interposed between the polarizing grid 28 and the lens 40. The quarter-wave plate 46 is a known component which converts a linearly polarized incident wave, such as that emitted by the source 26, into a circularly polarized wave. Such a circularly polarized wave may have more desirable reflection characteristics from an object to be imaged than the linearly polarized wave; for example, a linearly polarized wave can be reflected asymmetrically depending on the particular orientation of the object, whereas a circularly polarized wave has more uniform reflection characteristics. Upon reflection of the circularly-polarized wave from the object, the quarter-wave plate 46 will convert it back to a linearly polarized wave, such that it will pass through the polarizing grid 28 without substantial attenuation. The quarter-wave plate may be manufactured from crystalline sapphire or by machining the appropriate grooves into a dielectric material such as Rexolite ®.

Figure 5:
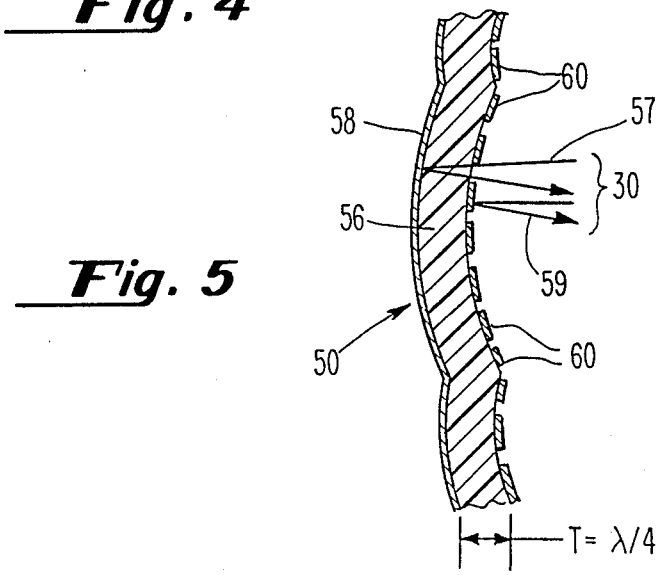
FIG. 5 shows a detailed view of the twist reflector employed in the second embodiment of the invention.

As indicated schematically in FIG. 4 and as shown in more detail in FIG. 5, the twist reflector 50 comprises a number of generally concave or dish-shaped elements arranged in an array. Preferably, the number of elements in this array is equal to the number of elements in the array of millimeter wave emitters making up source 26. The shape of the concave elements of the array 50 is such as to focus the divergent beams emitted by the elements of the source 26 onto a corresponding area on the surface of the array 36 of mixer/detector elements after reflection from the polarizing grid 28.

As indicated schematically in FIG. 5, the twist reflector 50 comprises a dielectric substrate 56 coated on its rear side with a conductive layer 58, and on its front surface with a series of strips 60 of conductive material oriented at 45° to the direction of polarization of the incident wave. The electrical thickness of the dielectric is one quarter wavelength, such that the effective travel distance of the wave through the dielectric is one-half wavelength. Accordingly, when a component 57 of the incident wave 30 which is reflected from the rear conductive layer 58 is combined with a component 59 directly reflected from the strips 60, they will be 180° out of phase. This is equivalent to rotating the direction of polarization of the incident beam by 90°. Accordingly, the beam 30 incident on the twist reflector 50 (which, it will be recalled, had passed through grid 28) is effectively rotated by b 90° with respect to the polarizing grid 28. When the rotated beam is again incident on grid 28, it is, therefore, reflected onto the array 36. Preferably, the concave elements of the twist reflector 50 are square and are fitted into a mosaic, in which as mentioned each element corresponds to one of the emitters of the source 26.

Figure 6:
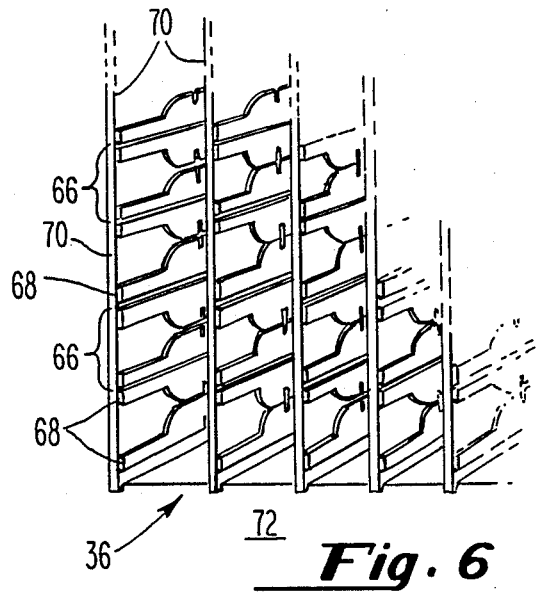
FIG. 6 shows a perspective view of the end of the focal-plane mixer/detector array which is exposed to incoming millimeter wave radiation to be used to form the image.
Figure 7:
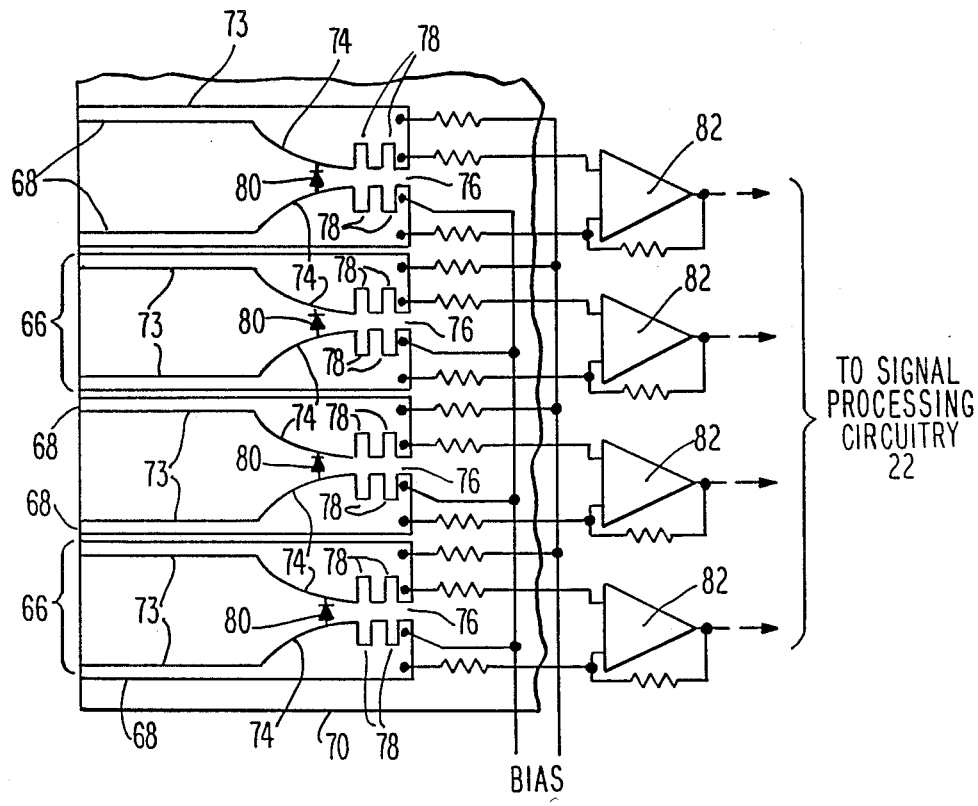
FIG. 7 shows a schematic diagram of salient portions of the circuitry connected to the mixer/detector array of the invention.

FIG. 6 shows a perspective view of a portion of the receiver array 36, while FIG. 7 shows a plan view of a substrate 70 on which conductors 68 making up the individual mixer/detector elements 66 of the array 36 are formed. Array 36 comprises a plurality of substantially identical mixer/detector elements indicated at 66. Each element 66 comprises two conductive antenna elements 68 which may be formed directly on a nonconductive dielectric substrate such as Kapton TM in turn supported on alumina panels 70, which are spaced from one another by a precision spacer member 72. The outline of a preferred embodiment of the antenna elements 68 is shown in FIG. 7. As indicated, the conductive antenna elements 68 comprise parallel portions 73 which extend a distance into the array (the incident radiation being received endwise in the view shown), curved portions 74 which approach one another along an exponentially curved outline, and further portions which are separated by a slot 76 and extend for another distance.

Such an antenna is referred to in the art as an "endfire traveling wave slot antenna", as originally described by P. J. Gibson, "The Vivaldi Aerial", Proc. of the European Mic. Conf., Brighton, UK (1979), pp. 101–105. Each antenna is paired with a nonlinear circuit element, e.g. a diode, which provides the mixing function. In a particular embodiment of the device of the present invention, the detector 36 may be an array 100×100 of elements 66, resulting in 10,000 identical mixer/detector elements in the overall array 36. This is adequate to provide quite reasonable resolution, for example, to produce an image of a field of view.

As indicated, each mixer/detector element 66 comprises a pair of conductors 68, each of which has a relatively thin forward section 73 extending toward the incoming reflected and local oscillator signals, an exponential middle section 74, and a terminal slot 76 separating the two elements 68. In a preferred embodiment, slot 76 has two additional slots 78 extending from either side thereof and orthogonal thereto. These slots 78 comprise a radio frequency choke which reflects the "sum" of the local oscillator and detected signals formed upon their mixing, while passing their "difference".

As noted, the actual mixing of the local oscillator signal with the signal received from the field of view is performed by a nonlinear circuit element, e.g., a diode 80, which is preferably physically disposed between the two conductive elements 68 of each element, that is, directly across the slot 76. In a preferred embodiment discussed in detail below, the diode 80 is formed directly on the substrate 70 without separate connecting leads.

After the local oscillator signal and the signal from the field of view have been mixed by diodes 80 and filtered by the RF chokes formed by the slots 78, the difference frequency signal which remains is a relatively "clean" intermediate frequency signal which can be amplified by conventional operational amplifiers 82 associated with each element 66 of the array 36. The output signals from amplifiers 82 can be supplied directly to the image formation or other signal processing circuitry 22 as indicated above.

FIG. 8 shows a cross-sectional view through one of the mixer diodes 80 which are preferably formed directly on the substrate 70 on which are formed the conductors 68 making up each of the antenna elements 66. In this embodiment, the diode 80 comprises bonding pads 84 and 85 which may be formed of gold and extend through vias 86 in an semi-insulating (SI) GaAs substrate 88. The gold bonding pads 84 and 85 contact further additional gold electrodes 90 and 92 formed on the opposite side of the substrate 88. Electrodes 90 and 92 overlay the actual diode structure. The diode structure comprises a first layer 94 of n+-GaAs which is in contact with the semi-insulating GaAs substrate 88. Over this is formed an n-GaAs layer 96. Atop this layer 96 is provided a layer 98 of Schottky metal, which in a preferred embodiment may be Ti/Pt/Au. The Schottky metal layer 98 is directly in contact with electrode 92 and is thus in contact with bonding pad 84. The n+-GaAs layer 94 is in contact with the other electrode 90 and thus the other bonding pad 85 via an ohmic layer 93 of AuGe/Ni. Finally, an insulating/ passivating SiO$_2$/-Si$_3$N$_4$ material fills spaces 100 and 102 between the various layers. In a particularly preferred embodiment, the spaces 100 and 102 may also include an air gap between the electrode 92 and the GaAs layers 93 and 94, i.e., around the Schottky metal 98, with or without the SiO$_2$/Si$_3$N$_4$ material. This has the beneficial effect of reducing the parasitic capacity of the mixer diode 80.

It will be appreciated that the structure described lends itself to ready fabrication directly on the substrate 70 carrying conductors 68 of the mixer/detector assembly, particularly as compared with a process involving assembly of conventional discrete diode elements, e.g., vertically-oriented or planar beam-lead diodes to the electrodes.

Ultimately, and subject to further developments in semiconductor materials and fabrication techniques, it may be possible to integrate the function of amplifiers 82 with that of mixer/detector diodes 80. This would require the development of amplifiers capable of operation at millimeter-wave frequencies. It is envisioned that such devices could perform the mixing and amplification functions within a single semi conductive element. This would be highly desirable, as it would presumably substantially increase the signal-to-noise ratio of each mixer/detector element 66. The claims of this application are intended to include such improved devices, when they become available.

FIG. 9 shows a partial end-on view of the emitter array 26, which emits the signal which is mixed with the received signal in both embodiments of the invention, and which additionally provides the illumination signal in the second embodiment of the invention. As indicated, the array 26 is made up of substantially identical elements 112. Typically the emitter array 26 may comprise 625 identical elements 112 in an 25×25 arrangement. Each of the individual elements 112 of the array 26, the structure of which is discussed below in connection with FIG. 10, comprises an indium phosphide (InP) Gunn diode or other oscillator coupled to a radiating horn. Preferably the array 26 may be made up of a number of sub-arrays 110 which are integrally fabricated for convenience in manufacturing and assembly.

FIG. 10 is a cross section taken along line 10—10 of FIG. 9, and shows a detail of one of the elements 112 in the source array 26. Each element comprises a linear oscillator cavity 114 including an integral radiator horn output section. The active element is a Gunn diode element 116, the construction of which is generally conventional. The cavity comprises a radial disc resonator 118 located along a coaxial RF choke structure 119 which supplies DC bias to the Gunn diode element 116. A fixed backshort 117 is used to optimize the performance of the basic oscillator. This type of element is referred to in the art as a "waveguide cavity resonator" which is driven by the Gunn diode.

As can be observed from FIG. 10, the diode element 116 is compressed by a threaded member 120 into the resonator structure 119. The center frequency of the Gunn diode oscillator is determined by the diameter of the resonator disc 118; minor adjustments to its frequency can be provided by mechanical tuning rod 124. The bias voltage of the InP Gunn diode can be varied to drive it at an operating frequency varying by approximately ±300 MHz at 95 GHz. If needed, additional tuning can be provided by introducing a dielectric material such as sapphire into the vicinity of the resonant disc 118. Typical continuous-wave radiative power levels for the device (as used in the second embodiment of the invention) are 100 mw/emitter at 95 GHz.

Selection of an operating wavelength and frequency for a device according to either embodiment of the invention involves several design tradeoffs. The characteristic atmospheric absorbtion dictates operation in either the 1.2 mm, 2 mm or 3 mm wavelength band. Aperture size is reduced for smaller wavelengths, encouraging miniaturization of antenna components, but mixer performance decreases at the higher frequencies concomitant with smaller wavelengths. At present, the optimum frequency is considered to be 94 GHz (3 mm wavelength) or 140 GHz (2 mm), but this could change as better components (principally mixers) become available. At these frequencies, atmospheric attenuation, including that due to water vapor is only a problem in very long range imaging systems.

It will be appreciated that there has been described a millimeter wave imaging device which comprises an array of mixer/detector elements, each adapted to provide an output intermediate frequency signal responsive to a local oscillator signal mixed with radiation reflected from a portion of a field of view. It will be appreciated that the mixer/detector array according to the invention is a "staring" array, that is, one which does not require mechanical or electronic scanning in order to view an entire field of view. At all times, the output signal from each of the mixer/detector elements of the array 36 corresponds to a portion of the device's field of view, that is, to a picture element or "pixel" of the image. For example, it would be possible to connect output elements (e.g., LEDs) individually to each of the mixer/detector elements in the array and provide an image directly, that is, without ever scanning the elements to generate a video image or the like.

On the other hand, if it were desired to display the image generated by the array of mixer/detector elements on a conventional video screen or the like, it would generally be necessary to successively interrogate each of the elements in a row of the array, thus generating a first line of the video display, then interrogate each of the elements of the next row of the array in order to generate the next line of the display, and so on, thus ultimately generating a complete raster scan. Such image generation techniques are within the skill of the art.

Any of a wide variety of image processing and image enhancement and analysis techniques may be combined with the image generation techniques according to the invention, such as convolution, false coloration, and identification of individual objects in the image both by comparison to known shapes and otherwise. Note in this connection that the fact that the image signal is provided pixel-by-pixel by the staring array of the invention makes it particularly amenable to many image processing techniques, especially those involving Fourier transformation. Such teachings, where within the skill of the art, are considered to be within the scope of the invention where not excluded by the following claims.

Therefore, while several preferred embodiments of the invention have been described in detail, these are to be considered exemplary only and not as limitations on the scope of the invention, which is defined only by the appended claims.

We claim:

1. A device for providing signals responsive to millimeter wave radiation detected from a field of view, comprising:
   an array of millimeter wave mixer/detector elements, optically aligned with the field of view;
   a multiple element array of sources of millimeter wave energy located at an angle to the axis of optical alignment of said array of mixer/detector elements and field of view;
   means for separating said energy into an illumination beam and a local oscillator beam;
   means for directing the illumination beam onto the field of view;
   means for directing the local oscillator beam onto the mixer/detector array so as to uniformly illuminate the mixer/detector array; and
   means for focusing milli field of view onto said mixer/detector 2. The device of claim 1, wherein said millimeter wave energy emitted by said source is linearly polarized and said means for separating comprises a polarizing grid.

3. The device of claim 2, further comprising means for rotating the polarization of one of said illumination and local oscillator beams.

4. The device of claim 3 wherein the polarization of said local oscillator beam is rotated by said means for rotation.

5. The device of claim 4, wherein said polarizing grid is employed to direct the illumination beam onto the field of view and direct the rotated local oscillator beam onto the mixer/detector array.

6. The device of claim 5 wherein said means for rotating is a twist reflector.

7. The device of claim 1 wherein the means for separating separates out the major portion of said energy to form said illumination beam.

8. The device of claim 1, wherein said millimeter wave energy emitted by said source is linearly polarized, and further comprising means for converting the linearly-polarized illumination beam into a circularly-polarized beam prior to direction thereof onto the field of view, and for converting the reflected millimeter wave energy back into a linearly polarized beam.

9. The device of claim 8 wherein said means for converting is a quarter-wave plate.

10. The device of claim 1 further comprising high-pass filter means located such that said illumination beam and said energy from said field of view pass therethrough.

11. The device of claim 1 wherein said array of sources millimeter wave energy is an array of Gunn diodes or other oscillators.

12. The device of claim 11 wherein the number of said oscillators in said array of sources is substantially less than the number of said mixer/detector elements in said array.

13. The device of claim 1 wherein said mixer/detector elements of said array each comprise an endfire traveling wave slot antenna and a nonlinear circuit element.

14. The device of claim 13 wherein said nonlinear circuit elements are Schottky barrier diodes.

15. The device of claim 14 wherein said antennas each comprise two planar conductors spaced from one another on a dielectric substrate, defining a slot between said conductors generally aligned along the optical axis between said field of view and said detector.

16. The device of claim 15 wherein each of said mixer/detector elements further comprises an RF choke.

17. The device of claim 16 wherein said RF choke comprises one or more slots in each of said planar conductors extending orthogonally to said slot between said planar conductors.

18. The device of claim 15 wherein the diode of each element is formed on a planar substrate and the active semiconductor member of said diode is contacted by conductor members, and wherein the active member of each diode is connected to said planar conductors by direct bonding of said conductor members to said planar conductors.

19. The device of claim 2 wherein said polarizing grid comprises a plurality of parallel conductive elements spaced from one another by a dielectric material.

20. The device of claim 19 wherein said polarizing grid comprises a number of parallel conductive members printed on and spaced from one another on a dielectric substrate.

21. The device of claim 3, wherein said means for rotating the polarization of one of said beams comprises at least one generally planar member comprising a dielectric substrate, a series of spaced parallel conductors on one side of said substrate, and a layer of conductive material on the other side of said substrate.

22. The device of claim 21, wherein said means for rotatinq is a mosaic assembly of said generally planar members.

23. The device of claim 22 wherein the number of said generally planar members making up said mosaic is equal to the number of said sources in said array of sources of millimeter wave energy.

24. The device of claim 23 wherein the arrangement of the members of said mosaic is concave and is aligned with a said array of sources of energy so as to direct the energy emitted thereby.

25. The device of claim 22 wherein each of said oscillator means of said source array comprises a waveguide cavity in combination with a Gunn diode or other oscillator.

26. The device of claim 25 wherein said oscillator is a Gunn diode.

27. The device of claim 1, in combination with means responsive to said mixer/detector elements for forming an image of objects in said field of view.

28. The combination of claim 27, wherein such image is made up of a number of picture elements, each corresponding to a single one of said mixer/detector elements.

29. A millimeter wave detecting device, comprising:
   an array of millimeter wave mixer/detector elements, aligned along an optical path with respect to a field of view;
   means for focusing millimeter wave radiation emitted by or reflected from objects in the field of view onto said mixer/detector array;
   an array of sources of millimeter wave energy located out of said optical path for generating a highly uniform millimeter wave local oscillator signal; and
   means disposed in said optical path for directing said millimeter wave local oscillator signal onto said mixer/detector array to uniformly illuminate said mixer/detector array, while permitting focused radiation to traverse said optical path to be incident onto the mixer/detector array;
   wherein each of the mixer/detector elements of the array detect and mix the local oscillator signal and focussed radiation from a particular portion of the field of view and provide an output signal responsive to said portion of the field of view.

30. The device of claim 29 further comprising high-pass filter means for passing energy detected from the field of view.

31. The device of claim 29 wherein said local oscillator signal is linearly polarized.

32. The device of claim 31, wherein said local oscillator signal is directed toward said means for directing in said optical path and said means for directing comprises a polarizing grid for directing said local oscillator signal onto said mixer/detector array while permitting said focused radiation received from the field of view to traverse the optical path.

33. The device of claim 32 wherein said polarizing grid comprises a plurality of parallel conductive elements spaced from one another by a dielectric.

34. The device of claim 29 wherein said local oscillator signal is of a frequency differing substantially from that of the radiation received from said field of view, and said means for directing disposed in said optical path comprises a frequency-selective element for directing said local oscillator signal onto said array permitting said focussed radiation from the field of view to traverse said optical path.

35. The device of claim 34 wherein said frequency-selective element is a dichroic reflector/high pass filter.

36. The device of claim 30 wherein said array of sources means is an array of waveguide cavities driven by oscillator means.

37. The device of claim 36 wherein said oscillator means comprise Gunn diodes.

38. The device of claim 33 wherein the number of said oscillators in said source array is substantially less than the number of mixer/detector elements in said array of mixer/detector elements.

39. The device of claim 29 wherein said mixer/detector elements each comprise an endfire traveling wave slot antenna and a nonlinear circuit element.

40. The device of claim 39 wherein said nonlinear circuit elements are Schottky barrier diodes.

41. The device of claim 40 wherein said antennas each comprise two planar conductors spaced from one another on a dielectric substrate, defining a slot between said conductors generally aligned along said optical path.

42. The device of claim 41 wherein each of said mixer/detector elements further comprises an RF choke.

43. The device of claim 42 wherein said RF choke comprises one or more slots in each of said planar conductors extending orthogonally to said slot between said planar conductors.

44. The device of claim 41 wherein the diode of each element is formed on a substrate and comprises an active semiconductor element contacted by metallic conductors, and wherein said metallic conductors are connected directly to said planar conductors of said antennas.

45. The device of claim 29 in combination with means responsive to said mixer/detector elements for forming an image of objects in said field of view.

46. The device of claim 45 wherein said image is made up of a number of picture elements, each of said picture elements corresponding to a single one of said elements of said array.

47. Method for generating an image of a field of view, comprising the steps of:

focusing millimeter wave energy emitted by or reflected from objects in a field of view onto an array of mixer/detector elements sensitive to millimeter-wave energy, thereby defining an optical path extending between said field of view and said array;

employing a multiple-element array of sources to generate a highly uniform beam of millimeter-wave energy, employing division means disposed in said optical path to divide said beam of millimeter-wave energy into minor and major components, directing a first minor portion of said beam onto said array of mixer/detector elements to uniformly illuminate said array of mixer/detector elements, directing a second major portion of said beam into the field of view, mixing the focussed energy with the minor portion of the beam individually in the elements of said mixer/detector array, detecting difference-frequency signals resulting from said mixing step with respect to each of the elements of said mixer/detector array, and employing the detected signals to form an image, in which individual picture elements of the image correspond to the signals detected by the individual mixer/detector elements of said array.

48. The method of claim 47 wherein said generated beam of energy is linearly polarized, and wherein the step of dividing said beam into said major and minor portions is performed using polarization-selective means.

49. The method of claim 48 comprising the additional step of rotating the minor portion of the beam through 90° and using said polarization-selective means to reflect the rotated beam toward said mixer/detector array.

50. The method of claim 48 wherein said polarization-selective means is a polarizing grid.

51. The method of claim 48 comprising the additional step of converting the major portion of the linearly-polarized beam into circularly polarized radiation prior to directing said major portion toward the field of view and converting the reflected energy back to linearly polarized radiation prior to directing the reflected beam onto the mixer/detector elements.

52. Method for generating an image of a field of view, comprising the steps of:

focusing energy reflected from or emitted by objects in the field of view onto an array of mixer/detector elements sensitive to millimeter-wave energy, thus defining an optical path extending between the field of view and the array;

employing a multiple element array of millimeter wave sources to generate a highly uniform local oscillator signal of millimeter-wave energy;

directing said local oscillator signal onto means disposed in said optical path for reflecting said local oscillator signal onto said array of mixer/detector elements, whereby said array of mixer/detector elements is uniformly illuminated by said local oscillator signal, individually mixing the focussed energy with the local oscillator signal in the elements of said mixer/detector array, detecting the signals resulting from said mixing step, and employing the detected signals to form an image in which individual picture elements of said image correspond to the signal detected by the individual mixer/detector elements of said array.

53. The method of claim 52 wherein the step of reflecting the local oscillator signal onto said array is performed by frequency-selective means located in the optical path between said field of view and said array.

54. A device for forming an image signal, said image signal comprising a number of pixels each corresponding to a predetermined portion of a field of view, said device comprising:
an array of a number of mixer/detector elements, the number being equal to the number of pixels of the image signal,
a multiple-element array of sources, each
a multiple-element array of sources, each emitting a millimeter wave local oscillator signal;
means for focusing radiation received from the field of view onto the mixer/detector array; and
means disposed between the means for focusing and the mixer/detector array for reflecting the local oscillator signal onto the mixer/detector array, while permitting passage therethrough of the radiation received from the field of view;
said elements of said mixer/detector array each being adapted to mix a local oscillator signal emitted by one of said sources with radiation emitted by or reflected from objects in a particular portion of the field of view, yielding sum and difference signals, and each comprising means for deriving a portion of the image signal from said difference signals corresponding to a single pixel of said image signal.

55. The device of claim 54 wherein said mixer/detector elements each comprise a non-linear circuit element connected across two opposed antenna elements.

56. The device of claim 55 wherein said non-linear circuit elements are diodes.

57. The device of claim 55 wherein said antenna elements comprise filter means adapted to pass said difference signals and reject said sum signals.

58. The device of claim 54 wherein the local oscillator signal and the radiation emitted by or reflected from the objects in the field of view are both of millimeter wave frequencies.

59. Method of forming an image of objects in a field of view, comprising the steps of:
focusing radiation received from objects in the field of view onto a mixer/detector array comprising a number of mixer/detector elements equal to the number of pixels in the image,
employing an array of millimeter wave sources to generate local oscillator signals,
disposing means for reflecting said local oscillator signals between said field of view and said mixer/detector array, said means for reflecting passing said focussed radiation therethrough,
mixing the local oscillator signal from one of said sources and radiation from a portion of the field of view to form sum and difference signals in each of said mixer/detector elements, and
using the difference signals from each of the mixer/detector elements to form the corresponding pixels of the image.

60. The method of claim 59 wherein said mixing step is performed in a non-linear circuit element comprised by each of said mixer/detector elements.

61. The method of claim 60 wherein said non-linear circuit elements are diodes.

62. The method of claim 61 wherein said diodes are connected across paired antenna elements making up said detectors.

63. The method of claim 62 comprising the further step of rejecting the sum signals in filter means comprised by said antenna elements.

64. The method of claim 59 wherein said local oscillator signal and said radiation are both at millimeterwave frequencies.

65. The device of claim 54 wherein said means for reflecting the local oscillator signal while permitting passage of the radiation received from the field of view is a frequency selective element.

66. The device of claim 65 wherein said frequency-selective element is a high-pass filter.

67. The device of claim 54 wherein said means for reflecting the local oscillator signal while permitting passage of the radiation received from the field of view is a polarization-sensitive element.

68. The device of claim 67 wherein said polarization-sensitive element is a polarizing grid.

* * * * *

UNITED STATES PATENT AND TRADEMARK OFFICE
CERTIFICATE OF CORRECTION

PATENT NO.   :   4,910,523

DATED        :   March 20, 1990

INVENTOR(S) :   Huguenin et al.

It is certified that error appears in the above-identified patent and that said Letters Patent is hereby corrected as shown below:

In the title, replace "MICROMETER" with -- MILLIMETER --.

Signed and Sealed this

Twenty-fifth Day of February, 1992

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,910,523
DATED : March 20, 1990
INVENTOR(S) : G. Richard Huguenin, er al.

It is certified that error appears in the above-identified patent and that said Letters Patent is hereby corrected as shown below:

Title page:

In the title, replace "MICROMETER" with -- MILLIMETER --.
In the section entitled "Inventors:", replace "Richard G." with --G. Richard--.
Column 2, line 32, after "oscillator" and before "is", replace "signals" with --signal--.
Column 2, line 41, after the beginning of line and before "to", replace "correspond" with --corresponds--.
Column 2, line 63, after "such" and before "arrangements", replace "Cassegraintelescope" with --Cassegrain-telescope--.
Column 3, lines 40-41, after "or" on line 40 and before "transmitting" on line 41, replace "frequencyselective" with --frequency-selective--.
Column 9, line 48, after "by" and before "90°", delete "b".
Column 9, line 48, after "by" and before "with", replace "90°" with -- 90°--.
Column 10, line 56, after "in" and before "semi-insulating", replace "an" with --a--.
Column 11, line 37, after "in" and before "25", replace "an" with --a--.
Column 13, line 9 (Claim 1), after "and" and before "field", insert --the--.
Column 13, line 17 (Claim 1), after "focusing" and before "of", replace "milli" with --millimeter wave radiation from the--.
Column 13, line 52 (Claim 11), after "sources" and before "millimeter" insert --of--.
Column 17, line 15 (Claim 54), delete entire line.

Signed and Sealed this

Ninth Day of February, 1993

Attest:

STEPHEN G. KUNIN

Attesting Officer

Acting Commissioner of Patents and Trademarks